US 6,634,142 B2

(12) United States Patent
Dobson et al.

(10) Patent No.: US 6,634,142 B2
(45) Date of Patent: Oct. 21, 2003

(54) APPARATUS FOR MOUNTING A DRIVE MECHANISM WITHIN A DOOR MODULE

(75) Inventors: Simon Dobson, Folkestone (GB); Arnd Herwig, Gifhorn (DE)

(73) Assignee: Meritor Light Vehicle Systems-France, Sully sur Loire (FR)

( * ) Notice: Subject to any disclaimer, the term of this patent is extended or adjusted under 35 U.S.C. 154(b) by 0 days.

(21) Appl. No.: 09/802,130

(22) Filed: Mar. 8, 2001

(65) Prior Publication Data

US 2001/0034975 A1 Nov. 1, 2001

Related U.S. Application Data
(60) Provisional application No. 60/188,973, filed on Mar. 10, 2000.

(30) Foreign Application Priority Data

Oct. 2, 2000 (GB) ............................................. 0024104

(51) Int. Cl.$^7$ ................................................. E05F 11/48
(52) U.S. Cl. ......................................... 49/352; 49/502
(58) Field of Search ......................... 49/352, 348, 349, 49/354, 502

(56) References Cited

U.S. PATENT DOCUMENTS

| | | | | |
|---|---|---|---|---|
| 4,191,060 A | * | 3/1980 | Sessa | 254/342 |
| 4,503,732 A | * | 3/1985 | Schust | 254/339 |
| 4,964,238 A | * | 10/1990 | Nishijima et al. | 49/349 |
| 4,970,911 A | * | 11/1990 | Ujihara et al. | 403/361 |
| 4,995,568 A | * | 2/1991 | Yamagishi et al. | 242/125.1 |
| 5,199,310 A | * | 4/1993 | Yoshimura | 242/375.3 |
| 5,375,375 A | * | 12/1994 | Lee | 49/352 |
| 5,425,206 A | | 6/1995 | Compeau et al. | |
| 5,505,022 A | * | 4/1996 | Shibata et al. | 49/349 |
| 5,749,174 A | * | 5/1998 | Mariel | 49/352 |
| 6,152,646 A | | 11/2000 | Muller-Blech | |
| 6,183,038 B1 | * | 2/2001 | Hansen et al. | 296/146.6 |
| 6,185,872 B1 | * | 2/2001 | Seeberger et al. | 49/502 |
| 6,397,524 B1 | * | 6/2002 | Sakaguchi et al. | 49/352 |
| 6,427,386 B1 | * | 8/2002 | Kalb et al. | 49/349 |

FOREIGN PATENT DOCUMENTS

| | | |
|---|---|---|
| DE | 19755899 A1 | 6/1999 |
| DE | 19619087 A1 | 11/2000 |
| EP | 0 451 019 A1 | 10/1991 |
| EP | 0663535 A | 7/1995 |
| EP | 0 811 516 A2 | 12/1997 |
| EP | 0 892 724 B1 | 11/2000 |
| GB | 597795 A | 2/1948 |
| GB | 2 222 847 A | 3/1990 |
| JP | 119236 | 5/2001 |

OTHER PUBLICATIONS

International Search Report, Mar. 1, 2001.
International Search Report.
International Search Report, dated Apr. 10, 2003.

* cited by examiner

Primary Examiner—Gregory J. Strimbu
(74) Attorney, Agent, or Firm—Carlson, Gaskey & Olds

(57) ABSTRACT

A door assembly includes a simple and compact mount for attaching a power or manual window drive mechanism within a door module. The drive mechanism can be removed from a door panel without having to remove the driven mechanism that lowers and raises the window. The drive mechanism is positioned on one side of the panel and the driven mechanism is positioned on an opposite side of the panel from the drive mechanism. A retaining assembly retains the driven and drive mechanisms to the panel such that the drive mechanism can be selectively detached from the panel without detaching the driven mechanism from the panel.

7 Claims, 6 Drawing Sheets

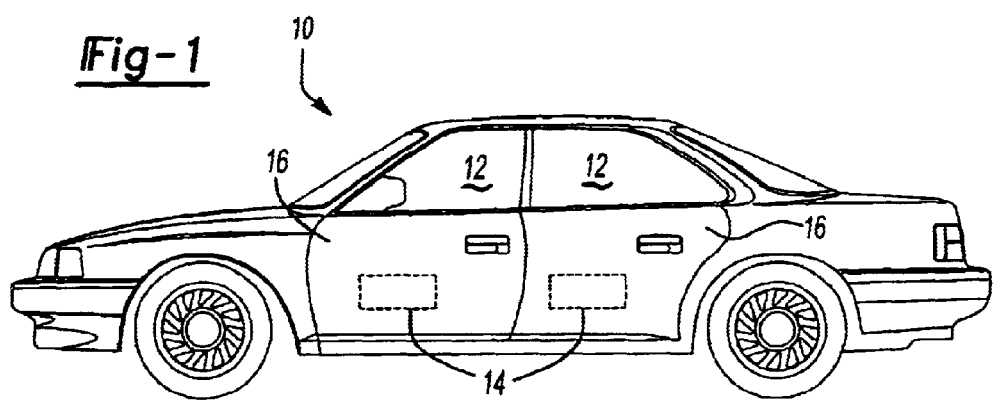
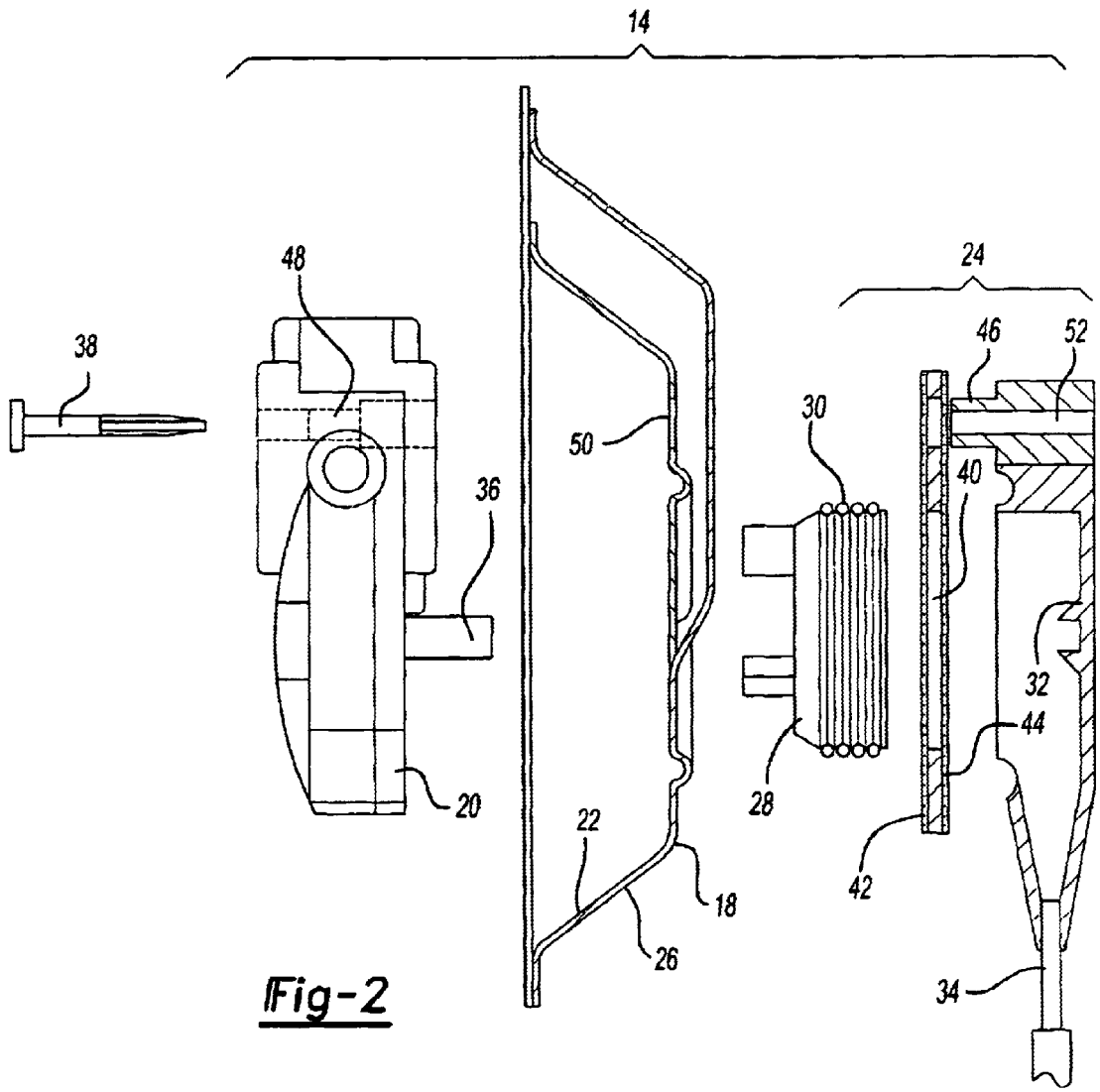

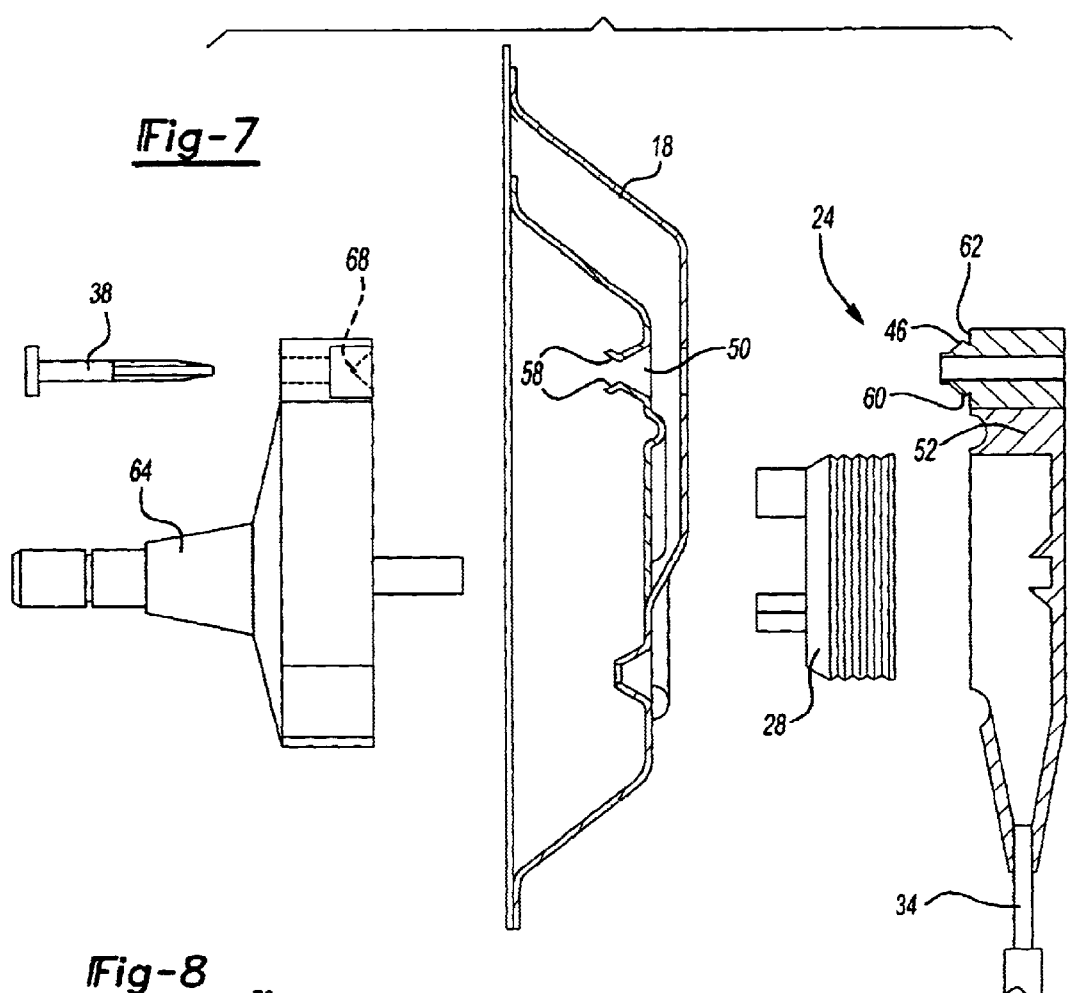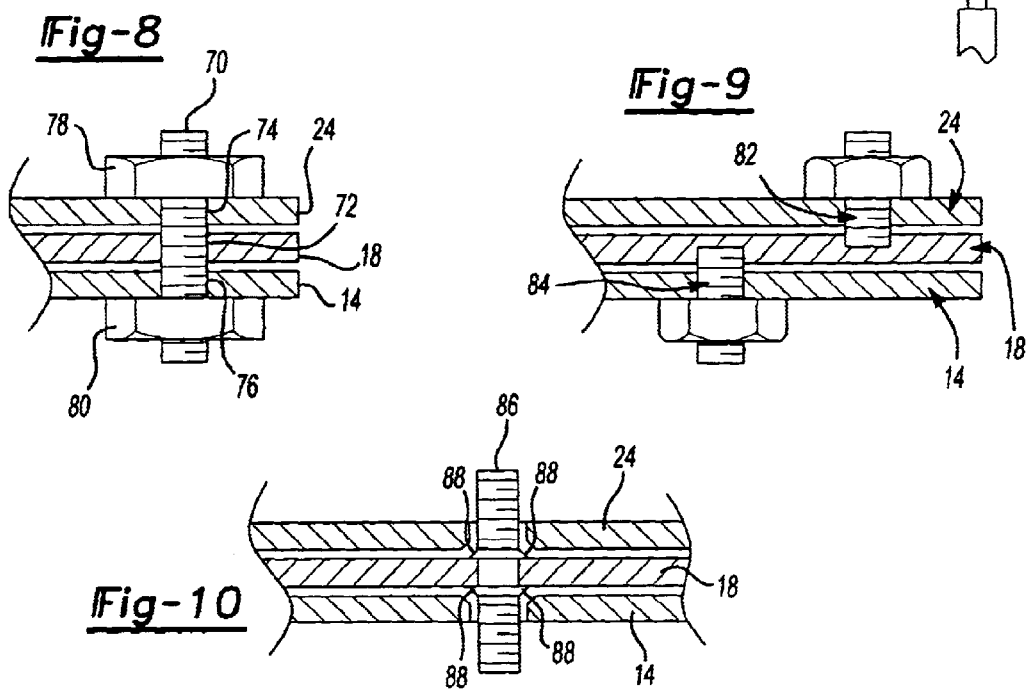

APPARATUS FOR MOUNTING A DRIVE MECHANISM WITHIN A DOOR MODULE

This application claims the benefit of provisional application Ser. No. 60/188,973 filed Mar. 10, 2000.

BACKGROUND OF THE INVENTION

This application relates to a method and apparatus for mounting a window drive mechanism within a vehicle door module.

Window drive mechanisms are used to move a vehicle door window between raised and lowered positions. The drive mechanisms can be either manually or electrically driven. In a manual drive interface, a handle is mounted to the vehicle door, which is connected to a cable and drum assembly that controls movement of the window. A vehicle occupant rotates the handle, which moves the window up or down depending on rotational direction. In a power drive interface, a motor mounted within the door is used to drive the cable and drum assembly. The vehicle occupant actuates a switch that controls the motor for moving the window up or down.

There is a limited amount of packaging space available within a door panel module for mounting of the drive mechanism and cable and drum assembly. Thus, the drive mechanism and cable and drum assembly components should be mounted together in a compact manner. Further, if there is a component failure within the window drive mechanism, the drive mechanism should be easily detached from the door panel module so that service operations can be performed.

Thus, it is desirable to have a mounting method and apparatus that provides a strong structural attachment for the drive mechanism and cable and drum components to the door panel module, and which is compact and easy to assemble and disassemble to perform service operations.

SUMMARY OF THE INVENTION

A mounting apparatus is used to mount a window drive mechanism to a door panel within a vehicle door module. The apparatus includes a manual or electric drive mechanism and a driven mechanism that raises or lowers the window. The drive mechanism is positioned on one side of the panel and the driven mechanism is positioned on an opposite side of the panel from the drive mechanism. A retaining assembly retains the driven and drive mechanisms to the panel such that the drive mechanism can be selectively detached from the panel without detaching the driven mechanism from the panel.

In one embodiment, the retaining assembly includes an adhesive membrane having adhesive on a first side for adhering to the panel and adhesive on a second side opposite from the first side for adhering to one or the drive or driven mechanisms.

In an alternate embodiment, the driven mechanism includes at least one male extension member for insertion through an opening in the panel. The drive mechanism includes a female member that receives the male member to properly locate the drive mechanism with respect to the door panel and driven mechanism. The retaining assembly includes a plurality of flexible fingers extending about a perimeter of the opening in the door panel. The flexible fingers grip the extension member when the driven mechanism is mounted to the panel.

In an alternate embodiment, the retaining assembly includes at least one stud with a threaded portion engaged with the panel and a pair of opposing ends inserted through openings in the drive and driven mechanisms respectively. A first nut retains the stud to the drive mechanism and a second nut retains the stud to the driven mechanism.

In an alternate embodiment, the retaining assembly includes at least a pair of studs with a first stud having a threaded distal end for engagement with the panel and a first retainer for retaining an opposing end of the first stud to the drive mechanism. A second stud has a threaded distal end for engagement with the panel and a second retainer for retaining an opposing end of the second stud to the driven mechanism.

In an alternate embodiment, the retaining assembly includes at least one stud extending through openings in the drive and driven mechanism with deformed portions engaging and retaining the stud to the panel between the drive and driven mechanisms.

The method of assembling a drive mechanism to a door panel includes the following steps. A driven mechanism is retained to one side of the door panel and a drive mechanism is located on an opposite side of the panel with respect to the driven mechanism. The drive mechanism is retained to the panel and driven mechanism such that the drive mechanism is selectively removable from the panel without detaching the driven mechanism from the panel.

The subject mounting method and apparatus provides a simple and compact mount for attaching a window drive mechanism within a door module. The capability of selectively detaching certain components without having to detach other components facilitates serviceability.

BRIEF DESCRIPTION OF THE DRAWINGS

FIG. 1 is schematic view of a vehicle incorporating the subject window drive mechanism mounted within a door panel module.

FIG. 2 is a side view of one embodiment for mounting a power drive mechanism within a door panel module.

FIG. 7 is a side view of an alternate embodiment for mounting a manual drive mechanism within a door panel module.

FIG. 8 is a cross-sectional view of an alternate embodiment for mounting a manual or power drive mechanism within a door panel module.

FIG. 9 is a cross-sectional view of an alternate embodiment for mounting a manual or power drive mechanism within a door panel module.

FIG. 10 is a cross-sectional view of an alternate embodiment for mounting a manual or power drive mechanism within a door panel module.

DETAILED DESCRIPTION OF THE PREFERRED EMBODIMENT

Figure 3:
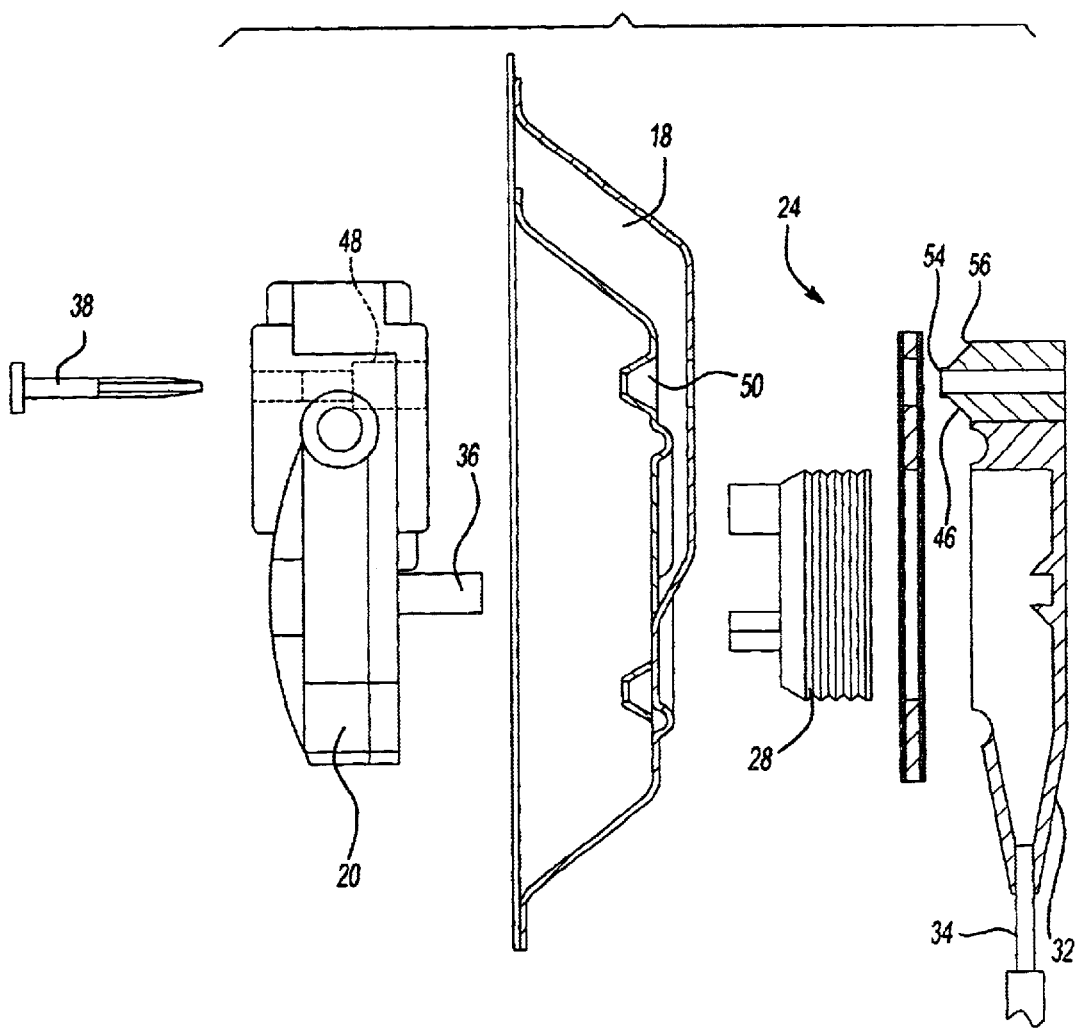
FIG. 3 is a side view of an alternate embodiment for mounting a power drive mechanism within a door panel module.

As shown in FIG. 1, a vehicle 10 includes a plurality of windows 12 that can be moved between raised and lowered positions. Window drive assemblies or window regulators, shown generally at 14, are mounted within each door panel module 16 for controlling movement of the windows. The drive assemblies 14 can be either manually or electrically driven.

An example of a power drive interfaces is shown in FIG. 2. The mounting apparatus for attaching a drive assembly 14 within the vehicle door module 16 includes a door panel member 18 that is mounted within the door module 16. An electric motor drive mechanism 20 is positioned on one side 22 of the panel 18 and a drum assembly 24 is positioned on an opposite side 26 of the panel 18 from the motor 20. Preferably, the drum assembly 24 is positioned on the "wet" side 26 of the door panel 18 and the motor 20 is positioned on the "dry" side 22 of the panel 18, however, the position of the components could also be reversed.

The drum assembly 24 is comprised of a drum 28 about which a flexible cable member 30 is wound. The drum 28 is mounted to a drum-box 32 that is attached to a vehicle door or frame member 34. The motor 20 includes a drive shaft 36 that drives the drum 28 to wind or unwind cable 30 from the drum 28 causing the window 12 to be raised or lowered depending on direction of rotation.

At least one fastener 38 is used to mounting the motor 20 and the drum assembly 24 to the panel 18. Preferably at least two (2) or three (3) fasteners 38 are used for attachment purposes, however, only one (1) is shown.

An adhesive membrane 40 is used to retain the drum assembly 24 to the panel 18. The use of the adhesive membrane 40 allows the motor 20 to be selectively detached from the panel 18 by removing the fastener 38 but prevents the drum assembly 24 from detaching from the panel 18. The adhesive membrane 40 has adhesive on a first side 42 for adhering to the panel 18 and adhesive on a second side 44 opposite from the first side 42 for adhering to the drum assembly 24. Any type of adhesive known in the art can be used, however, the adhesive should be strong enough to securely hold the drum assembly 24 to the panel 18 without the assistance of the fastener 38.

The drum assembly 24 includes at least one male member 46 and the motor 20 includes at least one female member 48. The male 46 and female 48 members are used to properly locate the motor 20 with respect to the panel 18 and the drum assembly 24. The male 46 and female 48 members are mated together during assembly of the motor 20 and drum assembly 24 to the panel 18. It should be understood that position the male 46 and female 48 members could be reversed.

The male member 46 extends through an opening 50 in the panel 18 when the drum assembly 24 is adhered to the panel 18. The female member 48 slides over the male member 46 when the motor 20 is fastened to the panel 18.

In one embodiment, the male member 46 includes a central bore 52 for receiving the fastener 38. The fastener is inserted through the motor 20 into the female member 48 and then into the male member 46.

Preferably, the male member 46 is cylindrical in shape, as shown in FIG. 2. In this embodiment, the male member is coaxial with the central bore 52 for receiving the fastener 38. It should be understood that the male member 46 could also be located separately from the fastening areas on the drum assembly 24.

In another embodiment shown in FIG. 3, the male member 46 is conical in shape and has a tip 54 that is smaller in diameter than the base 56.

Figure 4:
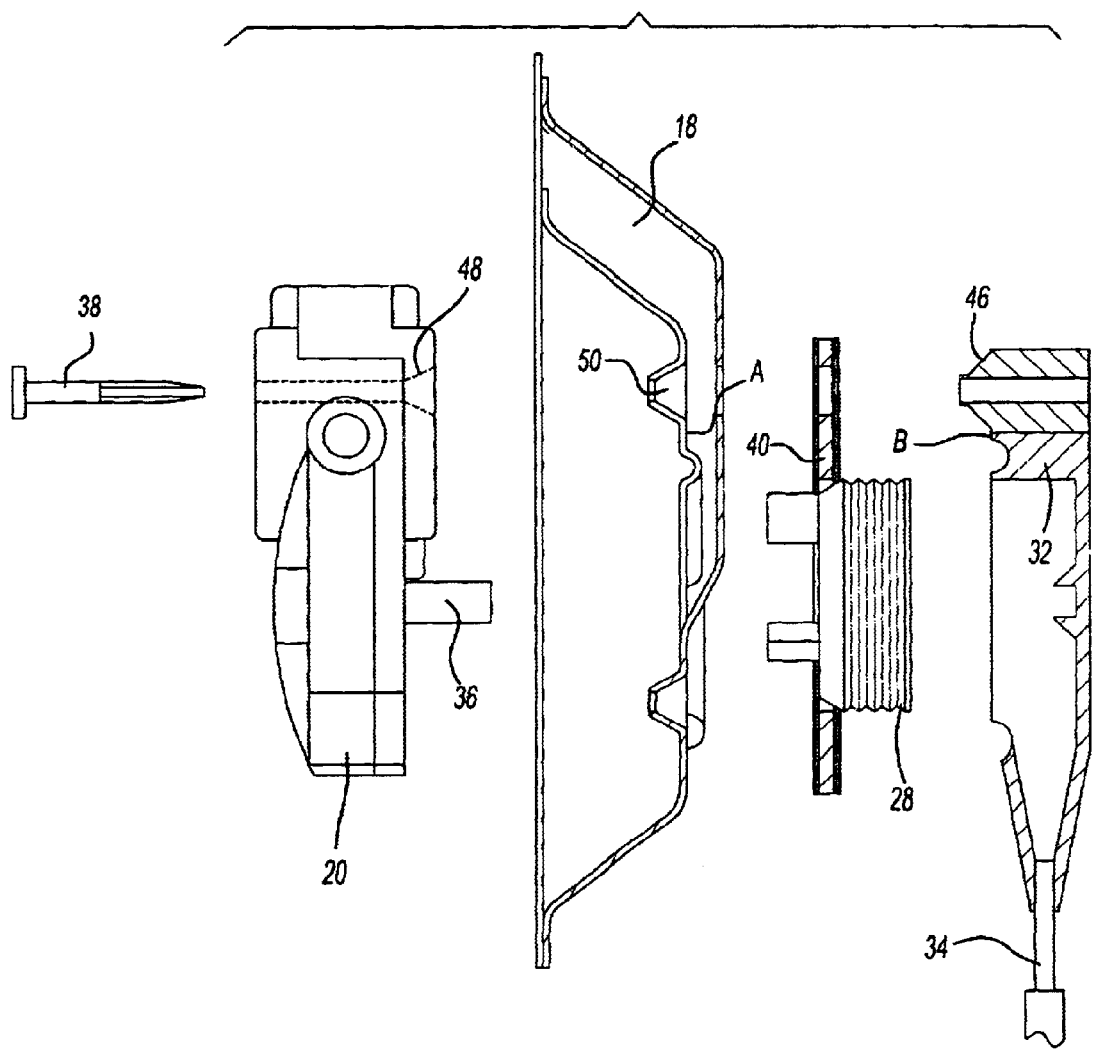
FIG. 4 is a side view of an alternate embodiment for mounting a power drive mechanism within a door panel module.

As shown in FIG. 4, the adhesive membrane 40 can either be attached first to the panel 18 as indicated at "A" or can be attached first to the drum assembly 24 as indicated at "B". Preferably, the adhesive membrane 40 is adhered to the drum-box 32 such that the drum 38 can engage the motor drive shaft 36 and rotate freely.

Figure 5:
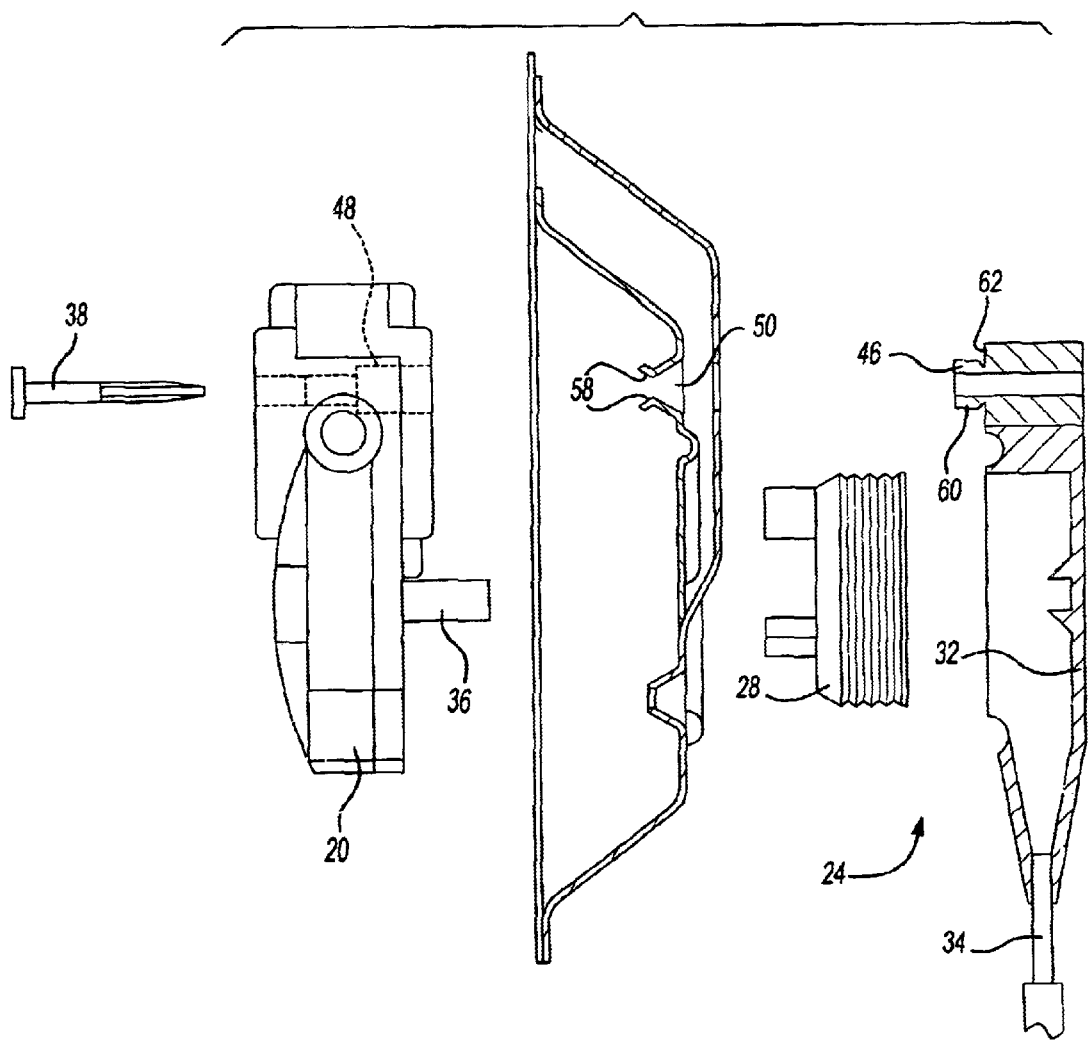
FIG. 5 is a side view of an alternate embodiment for mounting a power drive mechanism within a door panel module.

In an alternate embodiment, shown in FIG. 5, the drum assembly 24 is retained to the panel 18 by a plurality of "sprags" or flexible fingers 58. The fingers 58 are spaced about the opening 50 in the panel 18. The fingers grip the male member 46 when the male member is inserted through the opening. In this embodiment, the male member 46 includes a head portion 60 that is greater in width than a base or neck portion 62. As the male member 46 is inserted through the opening, the fingers 58 flex over the head portion 60 and grip about the neck portion 62. Although only one opening 50 is shown, the panel 18 can include several openings 50 with fingers 48 and the drum assembly 24 can include several male members 46.

Figure 6:
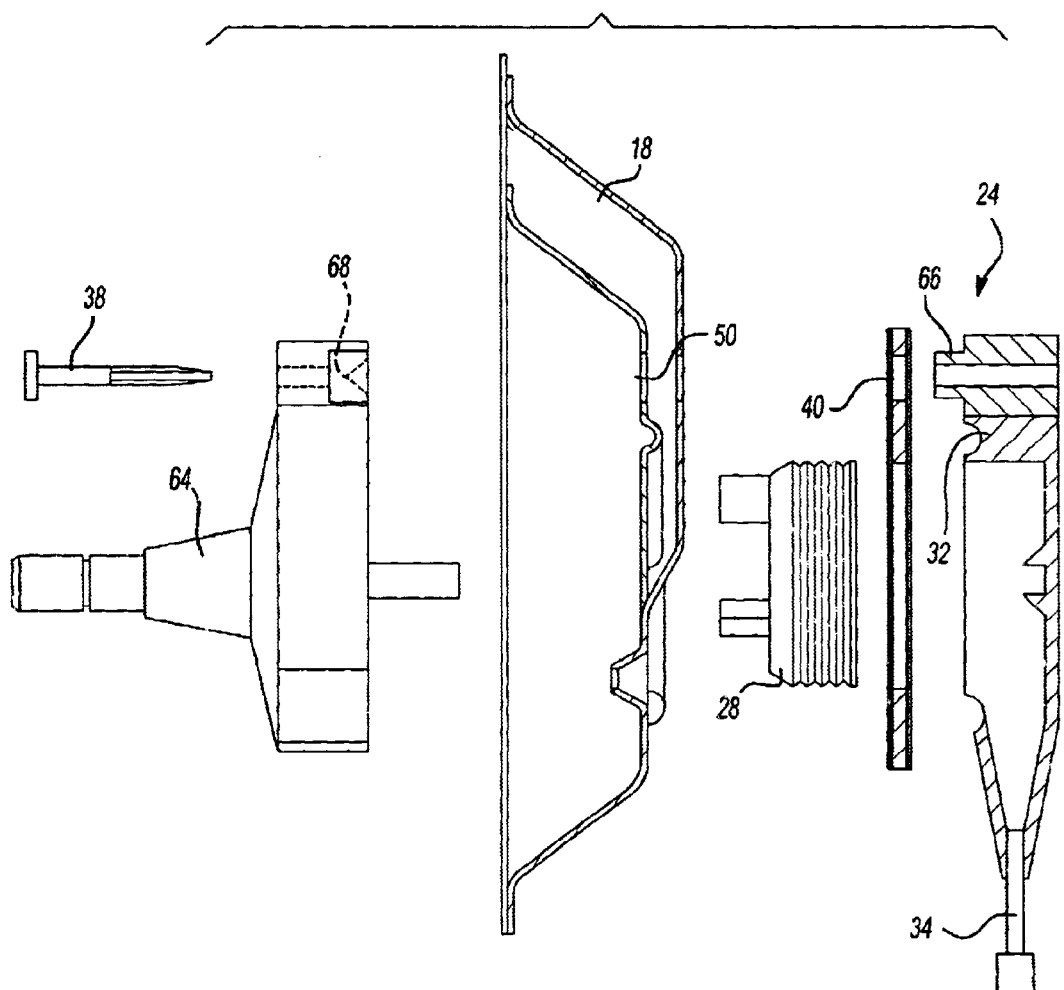
FIG. 6 is a side view of one embodiment for mounting a manual drive mechanism within a door panel module.

In a manual drive interface shown in FIG. 6, a handle portion 64 is mounted to the vehicle door panel 18. The handle 64 drives the drum assembly 24 to control movement of the window 12. A vehicle occupant rotates the handle 64, which moves the window 12 up or down depending on rotational direction.

The drum assembly includes a male member 66 and the handle 64 includes a female portion 68 that are configured similarly to the power drive interfaces discussed above. In one embodiment, the male members 66 are cylindrical in shape (FIG. 6) and in an alternate embodiment, the male members 66 are conical in shape (FIG. 7).

An adhesive membrane 40 (FIG. 6) can be used to retain the drum assembly 24 to the panel 18 or a plurality of flexible fingers 58 (FIG. 7) can be used to retain the drum assembly 24 to the panel 18. The adhesive membrane 40 and the flexible fingers 58 operate in a similar manner as discussed above with regard to the power drive mechanism. At least one fastener 38 is used to attach the handle 64 to the panel 18 and drum assembly 24. The handle 64 can be removed from the panel 64 selectively and independently from the drum assembly 24 for service operations.

An alternate retaining apparatus is shown in FIG. 8. A stud 70 is threaded along its entire length for insertion into the door panel 18. A mid-portion 72 of the stud 70 is threaded into a corresponding threaded hole in the door panel 18. Holes 74 and 76 in the drum assembly 24 and drive mechanism 14 respectively pass over the appropriate ends of the stud 70 to ensure that the drum 24 and drive mechanism 14 are aligned properly relative to the panel 18. The stud 70 is further utilized to secure the drum 24, panel 18, and drive mechanism 14 since nuts 78, 80 are used to tighten the various components. While preferably the entire length of stud 70 is threaded, it is possible to use a partially threaded or non-threaded stud in order to provide alignment of the various components.

An alternate retaining apparatus is shown in FIG. 9. Minimally, a first stud 82 is threaded at one end for engagement with the door panel 18 and an opposing second stud 84 is threaded at one end for engagement with the door panel 18. The first stud 82 is used to both align and secure the drum assembly 24 relative to the panel 18 and the second stud 84 is used to both align and secure the drive mechanism 14 relative to the door panel 18. While an opposing pair of studs 82, 84 is preferred additional studs could be utilized on both sides to more securely attach the various components.

An alternate embodiment is shown in FIG. 10. A stud 86 is secured to the drum assembly 24 by a swaging technique wherein portions 88 of the stud 86 have been plastically deformed in order that the panel 18 is clamped between these portions 88.

The subject mounting method and apparatus provides a simple and compact mount for attaching a window drive mechanism within a door module. The motor 20 or handle 64 can be removed from the door panel 18 without having to remove the drum assembly 24. This facilitates serviceability of the drive mechanism.

Preferred embodiments of this invention have been disclosed, however, a worker of ordinary skill in the art would recognize that certain modifications would come within the scope of this invention. For that reason the following claims should be studied to determine the true scope and content of this invention.

We claim:

1. An apparatus comprising:
   a door panel mounted within a vehicle door assembly;
   a drive mechanism positioned on one side of said panel;
   a drum assembly positioned on an opposite side of said panel from said drive mechanism wherein said drum assembly includes at least one male extension member for insertion through an opening in said panel;
   at least one fastener mounting said drive mechanism and said drum assembly to said panel; and
   a retaining member retaining said drum assembly to said panel, said retaining member comprising a plurality of flexible fingers extending about a perimeter of said opening, said flexible fingers gripping said extension member when said drum assembly is mounted to said panel wherein said drive mechanism can be selectively detached from said panel by removing said fastener without detaching said drum assembly from said panel.

2. An apparatus according to claim 1 wherein said at least one male extension member comprises a first locating portion and said drive mechanism includes at least one second locating portion, said first and second locating portions being mated together during assembly of said drive mechanism and drum assembly to said panel.

3. An apparatus according to claim 2 wherein said second locating portion is a female member that receives said male member when said drive mechanism is fastened to said panel.

4. An apparatus according to claim 3 wherein said male member includes a central bore for receiving said fastener.

5. An apparatus according to claim 3 wherein said male member has a cylindrical shape.

6. An apparatus according to claim 5 wherein said cylindrical male member includes a central bore.

7. An apparatus according to claim 1 wherein said male extension member includes a head portion having a first width and a neck portion having a second width less than said first width, said flexible fingers flexing over said head portion to grip said neck portion when said drum assembly is mounted to said panel.

* * * * *